United States Patent
Ishikawa

(10) Patent No.: US 8,555,505 B2
(45) Date of Patent: Oct. 15, 2013

(54) MAXIMUM MESHABLE TOOTH PROFILE HAVING NON-POSITIVE DEFLECTION IN FLAT WAVE GEAR DEVICE

(75) Inventor: Shoichi Ishikawa, Yokohama (JP)

(73) Assignee: Harmonic Drive Systems Inc., Tokyo (JP)

( * ) Notice: Subject to any disclaimer, the term of this patent is extended or adjusted under 35 U.S.C. 154(b) by 436 days.

(21) Appl. No.: 12/926,698

(22) Filed: Dec. 6, 2010

(65) Prior Publication Data
US 2011/0138952 A1    Jun. 16, 2011

Related U.S. Application Data

(62) Division of application No. 12/273,944, filed on Nov. 19, 2008, now abandoned.

(30) Foreign Application Priority Data

Dec. 4, 2007  (JP) ................................. 2007-313629
Jan. 16, 2008  (JP) ................................. 2008-006645

(51) Int. Cl.
*B21D 53/28* (2006.01)
*F16H 55/16* (2006.01)

(52) U.S. Cl.
USPC .............................. 29/893.3; 29/893; 74/461

(58) Field of Classification Search
USPC ............ 29/893, 893.3; 74/461, 460, 457, 640
See application file for complete search history.

(56) References Cited

U.S. PATENT DOCUMENTS

| 2,906,143 | A |   | 9/1959  | Musser |
| 3,415,143 | A | * | 12/1968 | Ishikawa .......................... 74/640 |
| 3,996,816 | A | * | 12/1976 | Brighton .......................... 74/640 |
| 4,703,670 | A |   | 11/1987 | Kondo |

(Continued)

FOREIGN PATENT DOCUMENTS

| JP | 45-41171  | 12/1970 |
| JP | 64-079448 | 3/1989  |

(Continued)

*Primary Examiner* — David Bryant
*Assistant Examiner* — Jacob Cigna
(74) *Attorney, Agent, or Firm* — Buchanan Ingersoll & Rooney PC

(57) ABSTRACT

In a flat wave gear device, there is determined a rack-approximated movement locus Lc1 of a flexible externally toothed gear with respect to an S-side rigid internally toothed gear accompanying rotation of a wave generator. $\rho_{OPT}$ is a minimum value of the radius of curvature of the movement locus Lc1, and is determined from an evolute e of the movement locus Lc1. A convex arc having a radius $\rho$ ($\rho \leq \rho_{OPT}$) is used in a main part of a tooth profile of the flexible externally toothed gear. A parallel curve c that is set apart from a movement locus Lc2 by the arc radius $\rho$ is used on a main part of a tooth profile to be generated on the S-side rigid internally toothed gear. The movement locus Lc2 accounts for the actual number of teeth, and is obtained from a center A of a convex arc of the flexible externally toothed gear being drawn with respect to the rigid internally toothed gear. In a flat wave gear device that is provided with a flexible externally toothed gear having a non-positive deflection ($\kappa \leq 1$) tooth profile, a tooth depth of the flexible externally toothed gear can be increased, whereby ratcheting torque is increased and meshing can occur continuously over an entire range of a movement locus; and a load capacity of the flat wave gear device is increased.

4 Claims, 6 Drawing Sheets

(56) References Cited

U.S. PATENT DOCUMENTS

| | | | |
|---|---|---|---|
| 4,823,638 A * | 4/1989 | Ishikawa | 74/640 |
| 4,974,470 A * | 12/1990 | Ishikawa et al. | 74/640 |
| 5,456,139 A * | 10/1995 | Aubin | 74/640 |
| 5,662,008 A * | 9/1997 | Aubin et al. | 74/640 |
| 5,918,508 A * | 7/1999 | Ishikawa | 74/640 |
| 2007/0180947 A1 | 8/2007 | Ishikawa et al. | |

FOREIGN PATENT DOCUMENTS

| | | | |
|---|---|---|---|
| JP | 07-167228 | | 7/1995 |
| JP | 07167228 A | * | 7/1995 |
| JP | 2503027 | | 3/1996 |

* cited by examiner

MAXIMUM MESHABLE TOOTH PROFILE HAVING NON-POSITIVE DEFLECTION IN FLAT WAVE GEAR DEVICE

CROSS REFERENCE TO RELATED APPLICATIONS

This application is a divisional of application Ser. No. 12/273,944, filed on Nov. 19, 2008, which claims priority to Japanese Application No. 2007-313629, filed on Dec. 4, 2007, and Japanese Application No. 2008-006645, filed on Jan. 16, 2008, the specifications of which are incorporated herein by reference in their entireties for all purposes.

TECHNICAL FIELD

The present invention relates to a flat wave gear device, and in particular relates to a method for setting a tooth profile providing a function whereby teeth continuously mesh at a low reduction ratio and ratcheting torque is increased.

BACKGROUND ART

From the original invention of the wave gear device by C. W. Musser (U.S. Pat. No. 2,906,143) up to the present, a variety of inventions have been proposed by Musser and numerous other researchers, including the present inventor. A variety of inventions have been proposed in regard to the tooth profile alone. One such invention proposed by the present inventor is a method for designing a tooth profile that applies the technique of rack approximation to the meshing between teeth of a rigid internally toothed gear and teeth of a flexible externally toothed gear, whereby addendum profiles of both gears enabling wide-range tooth engaging therebetween is derived (JP 45-41171 B). An application has also been filed for an invention used to avoid tooth profile interference generated by rack approximation (JP 7-167228 A).

There is known a flat wave gear device configured to have an annular flexible externally toothed gear disposed within two rigid internally toothed gears arranged in parallel, and an elliptical wave generator mounted in the interior thereof (JP 2503027). A typical flat wave gear device is shown in FIG. 6. In a flat wave gear device 100, one rigid internally toothed gear 102 has the same number of teeth as a flexible externally toothed gear 104, and another rigid internally toothed gear 103 has 2n more teeth (n is a positive integer) than the flexible externally toothed gear 104. In the present specification, the rigid internally toothed gear having a different number of teeth than the flexible externally toothed gear is referred to as the "S-side rigid internally toothed gear," and the rigid internally toothed gear having the same number of teeth as the flexible externally toothed gear is referred to as the "D-side rigid internally toothed gear."

When a wave generator 105 having an elliptical contour is caused to rotate, counter-rotation occurs between the flexible externally toothed gear 104 and the S-side rigid internally toothed gear 103, which have different numbers of teeth. For example, by securing the S-side rigid internally toothed gear 103 so as to prevent rotation, and supporting the D-side rigid internally toothed gear on the other side in a rotatable state, reduced-speed rotation will be outputted from the D-side rigid internally toothed gear 102.

In order to prevent an increase in flexural stress caused by elliptical deformation of the flexible externally toothed gear at low reduction ratios (e.g., 60 or higher) in a flat wave gear device, the degree of radial deflection κmn (κ being the flexing coefficient, and m being the module of both gears) must be reduced to κmn (κ<1) from mn (κ=1), which is the normal degree of deflection (value obtained by dividing the pitch diameter of the flexible externally toothed gear by the reduction ratio when the rigid internally toothed gear is fixed). Since tooth depth is related to the degree of deflection, reducing the deflection leads to a decrease in the tooth depth, and in turn to a decrease in the ratcheting torque.

In order to prevent ratcheting under high load torque, it is necessary to increase tooth depth as much as possible, and the meshing region must be maximally enlarged in association therewith. However, tooth profiles that prevent ratcheting, which is a phenomenon whereby tooth-jumping occurs under high load torque, have yet to be proposed for flat wave gear devices having a low reduction ratio of 60 or less, such that the problem is addressed while continuous contact is maintained at high degree.

DISCLOSURE OF THE INVENTION

An object of the present invention is to provide a flat wave gear device provided with a flexible externally toothed gear having a tooth profile such that $\kappa \leq 1$ (referred to as the "non-positive deflection" flexing coefficient), wherein the tooth depth of the flexible externally toothed gear is increased, thereby allowing ratcheting torque to be raised, and meshing to occur continuously over the entire range of a movement locus.

In order to overcome the problems described above, the present invention is a method for setting a tooth profile in a flat wave gear device that has an S-side rigid internally toothed gear disposed in parallel in a coaxial state with a D-side rigid internally toothed gear, an annular flexible externally toothed gear disposed in a coaxial state within the S-side and the D-side rigid internally toothed gears, and a wave generator for causing a cross-section of the flexible externally toothed gear given perpendicularly with respect to an axis thereof to flex elliptically and the resulting shape to rotate, the number of teeth on the D-side rigid internally toothed gear being the same as the number of teeth on the flexible externally toothed gear, and the number of teeth on the S-side rigid internally toothed gear having 2n more teeth (n being a positive integer) than the number of teeth on the flexible externally toothed gear, wherein the method is characterized in comprising:

using both the flexible externally toothed gear and the S-side internally toothed gear as spur gears of module m;

setting κmn ($\kappa \leq 1$) and −κmn as a degree of radial flexing on, respectively, a major and minor axis of an elliptically shaped rim neutral line of the flexible externally toothed gear in the cross-section of the flexible externally toothed gear given perpendicularly with respect to the axis;

determining a rack-approximated movement locus of the flexible externally toothed gear with respect to the S-side rigid internally toothed gear accompanying rotation of the wave generator;

taking $\rho_{OPT}$ as a minimum value of a radius of curvature of the movement locus; and using a convex arc having a radius ρ ($\rho \leq \rho_{OPT}$) on a main part of a tooth profile of the flexible externally toothed gear.

The radius ρ of the convex arc of the flexible externally toothed gear is preferably a value within a range of up to 5% of the minimum value $\rho_{OPT}$.

The movement locus can be determined using formula (1), an evolute of the movement locus can be determined using formula (2), and the radius of curvature $\rho_{OPT}$ can be determined using formula (3) with θ=π in the formula (2).

$$x = 0.5mn(\theta - \kappa\sin\theta)$$
$$y = -\kappa mn(1 - \cos\theta)$$
(1)

-continued $$x = mn\left[0.5(\theta - \kappa\sin\theta) + \frac{2\{0.25(1-\kappa\cos\theta)^2 + \kappa^2\sin^2\theta\}^{1.5}}{\kappa(\kappa - \cos\theta)}\cos\left\{\tan^{-1}\frac{0.5(1-\kappa\cos\theta)}{\kappa\sin\theta}\right\}\right] \quad (2)$$

$$y = mn\left[\kappa\cos\theta - 1 + \frac{2\{0.25(1-\kappa\cos\theta)^2 + \kappa^2\sin^2\theta\}^{1.5}}{\kappa(\kappa - \cos\theta)}\sin\left\{\tan^{-1}\frac{0.5(1-\kappa\cos\theta)}{\kappa\sin\theta}\right\}\right]$$

$$\rho_{OPT} = \frac{0.25mn\ (1+\kappa)^2}{\kappa} \quad (3)$$

The present invention is further characterized in comprising:

determining a movement locus wherein a center of the convex arc of the flexible externally toothed gear is drawn with respect to the S-side rigid internally toothed gear, with consideration given to the actual number of teeth;

determining a parallel curve set apart from the movement locus by radius ρ; and using the parallel curve in a main part of a tooth profile to be generated on the S-side rigid internally toothed gear.

It is preferable to determine a movement locus obtained from a tooth crest of the tooth profile of the flexible externally toothed gear being drawn with respect to the S-side rigid internally toothed gear, with consideration given to the actual number of teeth; and to have a maximum value of a tooth depth of the tooth profile to be generated on the S-side rigid internally toothed gear be a value up to the extrema of the movement locus.

According to the flat wave gear device of the present invention, the tooth profiles of the flexible externally toothed gear and the rigid internally toothed gears are defined by the method described above.

EFFECT OF THE INVENTION

According to the present invention, in a flat wave gear device that is provided with a flexible externally toothed gear having a non-positive deflection (κ≤1) tooth profile, a tooth depth of the flexible externally toothed gear is increased, whereby ratcheting torque is increased and meshing can occur continuously over an entire range of a movement locus; and a load capacity of the flat wave gear device is increased. The load capability of a flat wave gear device can thereby be increased.

BEST MODE FOR CARRYING OUT THE INVENTION

A method will be described below with reference to the attached drawings for setting tooth profiles of a flexible externally toothed gear and a rigid internally toothed gear having different numbers of teeth in a flat wave gear device in which the present invention is applied.

Figure 6:
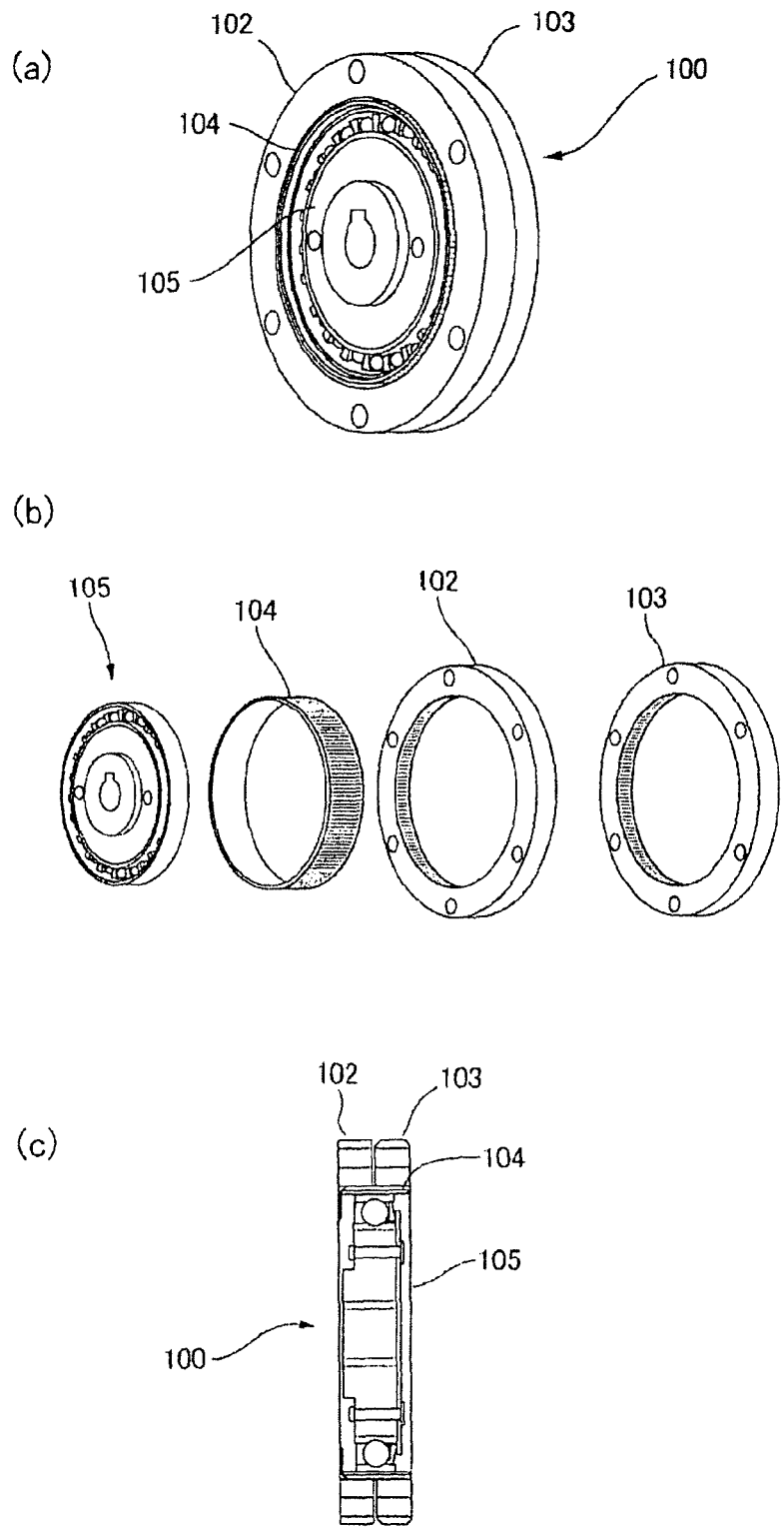
FIG. 6 shows a perspective view, an exploded perspective view, and a sectional view of a flat wave gear device.

The flat wave gear device is the same as the generic model shown in FIG. 6. The number of teeth on an S-side rigid internally toothed gear and the number of teeth on a flexible externally toothed gear differ by 2n (n is a positive integer), and the total amplitude of a movement locus of the flexible externally toothed gear is 2κmn (the flexing coefficient κ being a value of one or less, and m being the module).

Figure 1:
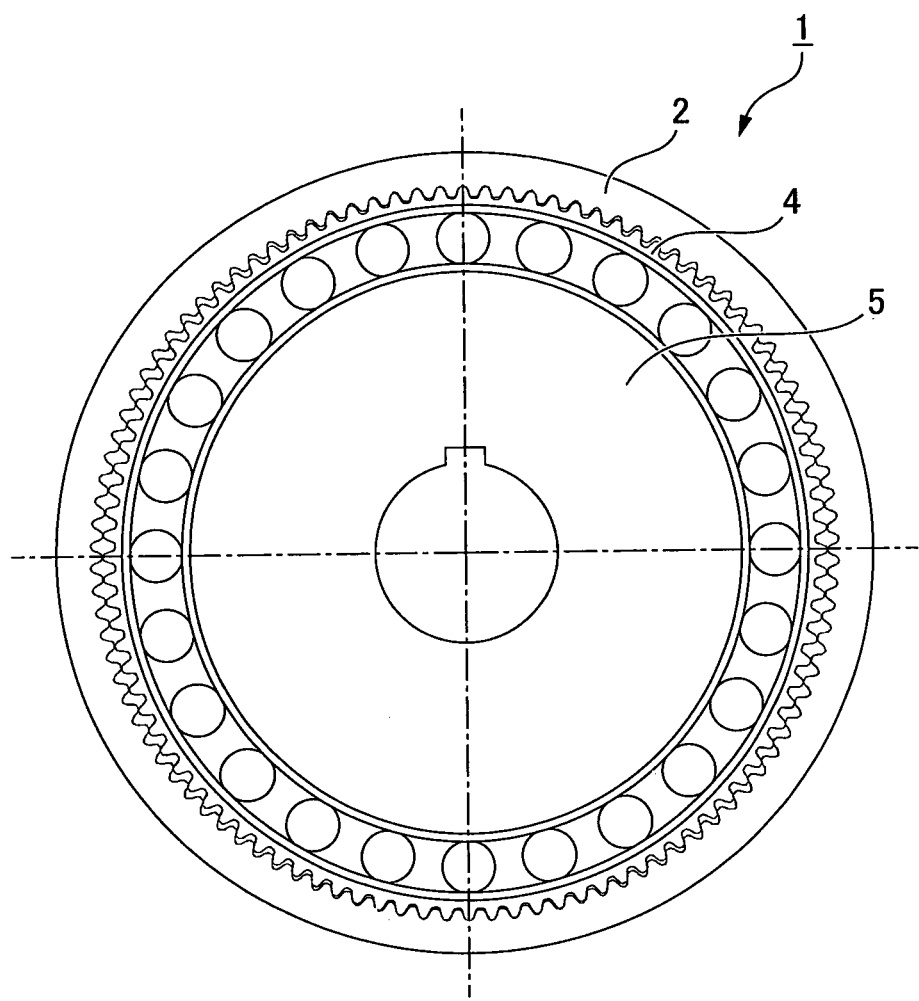
FIG. 1 is a descriptive diagram showing a flat wave gear device in a case where the tooth difference is 2 (n=1)

FIG. 1 is a descriptive diagram showing an S-side rigid internally toothed gear 2, a flexible externally toothed gear 4, and a wave generator 5 in a flat wave gear device 1 in which the difference between the number of teeth is 2 (n=1).

(Method for Determining Tooth Profile of Flexible Externally Toothed Gear)

Figure 2:
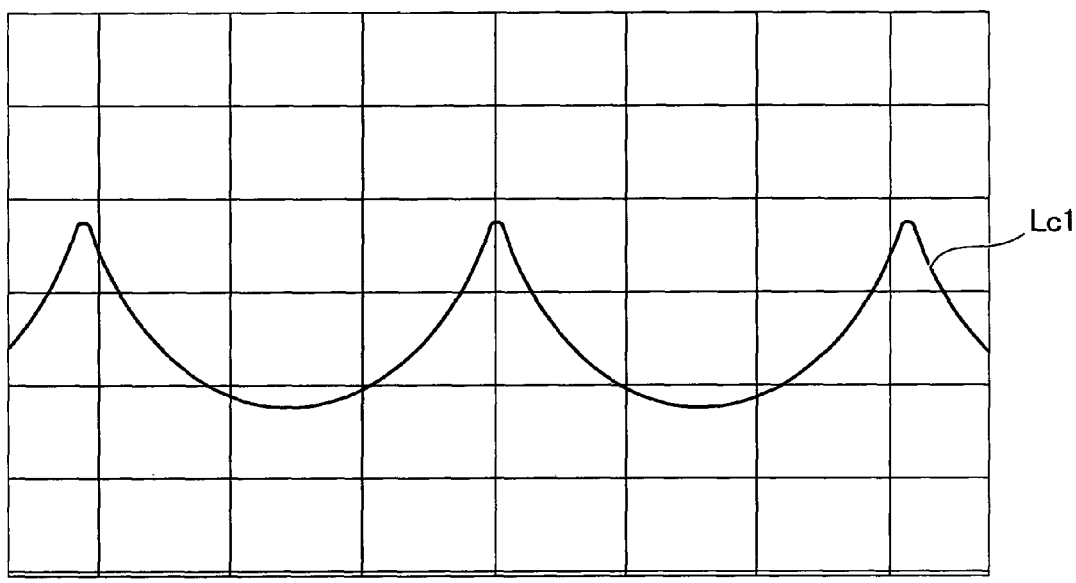
FIG. 2 is a diagram showing a curve that expresses a rack-approximated movement locus of a tooth profile of a flexible externally toothed gear with respect to a rigid internally toothed gear.

FIG. 2 is a diagram showing a movement locus used as a basis for selecting an arc radius used to define a tooth profile of a main part (portion that includes a tooth profile of an addendum) of the flexible externally toothed gear 4. In a cross-section of the flexible externally toothed gear 4 given perpendicularly with respect to the axis, the movement locus Lc1 is a rack approximation of relative movement between the teeth of the flexible externally toothed gear 4 and the teeth of the rigid internally toothed gear 2 accompanying rotation of the wave generator 5. Specifically, the movement locus Lc1 is the movement locus of the flexible externally toothed gear 4 in a case where an approximation of rack meshing is made, wherein the rigid internally toothed gear and the flexible externally toothed gear have an infinite number of teeth. The movement locus Lc1 is obtained using formula (1) below.

$$x = 0.5\ mn(\theta - \kappa\sin\theta)$$

$$y = -\kappa mn(1 - \cos\theta) \quad (1)$$

Figure 3:
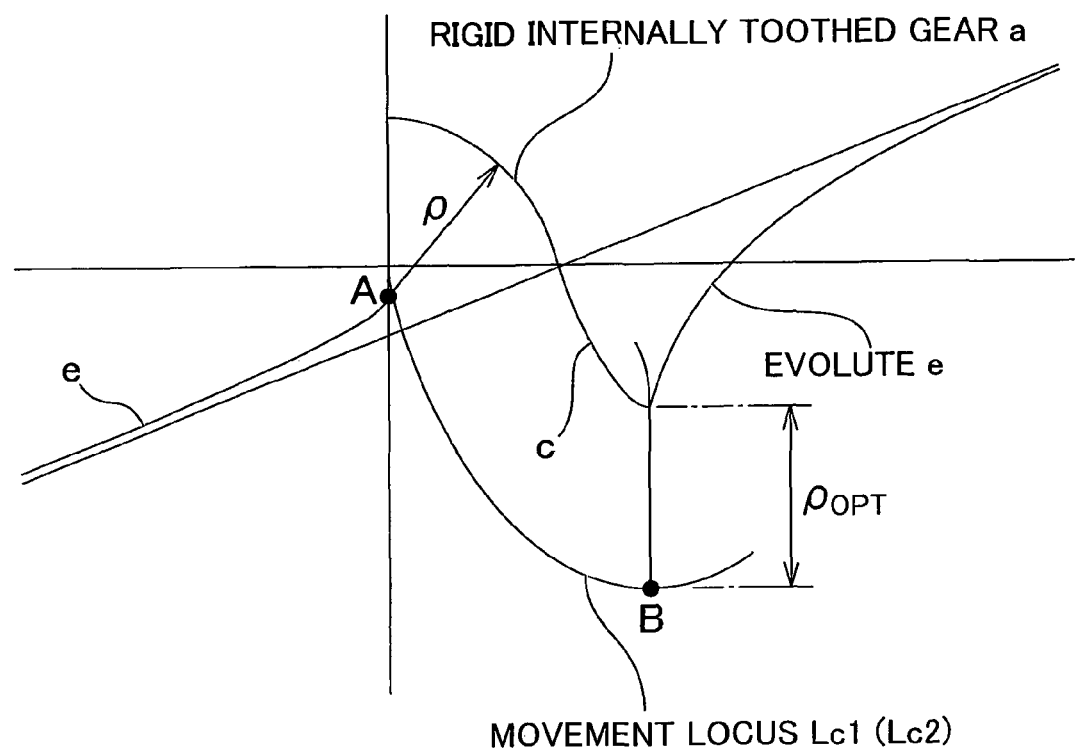
FIG. 3 is a diagram showing an evolute of the curve in FIG. 2 that illustrates the movement locus.

A general formula for determining an evolute of the movement locus Lc1 is used to determine the evolute of the movement locus Lc1 (locus of the center of curvature at every point of the movement locus). An evolute e is expressed by formula (2) below. Formula (2) is being indicated for the first time by the present inventor. An example of the evolute e is shown in FIG. 3.

$$x = mn\left[0.5(\theta - \kappa\sin\theta) + \frac{2\{0.25(1-\kappa\cos\theta)^2 + \kappa^2\sin^2\theta\}^{1.5}}{\kappa(\kappa - \cos\theta)}\cos\left\{\tan^{-1}\frac{0.5(1-\kappa\cos\theta)}{\kappa\sin\theta}\right\}\right] \quad (2)$$

$$y = mn\left[\kappa\cos\theta - 1 + \frac{2\{0.25(1-\kappa\cos\theta)^2 + \kappa^2\sin^2\theta\}^{1.5}}{\kappa(\kappa - \cos\theta)}\sin\left\{\tan^{-1}\frac{0.5(1-\kappa\cos\theta)}{\kappa\sin\theta}\right\}\right]$$

In order to set the tooth profile of the main part of the flexible externally toothed gear 4, first, the main part of the tooth profile of the flexible externally toothed gear 4 is given as a convex arc a having radius ρ with point A as the center. To maximize the range over which the gears 2, 4 mesh, the meshing range may be extended to the extrema relating to the point corresponding to the lowest value on the locus Lc1 of the flexible externally toothed gear 4 with respect to the S-side rigid internally toothed gear 2; i.e., the singularity of the evolute e. Specifically, the movement locus Lc1 between point A, where meshing begins (θ=180°), to point B, where meshing is deepest (θ=0°) may be used.

AB in FIG. 3 shows this range. The maximum value $\rho_{OPT}$ of the arc radius ρ of the flexible externally toothed gear 4 is determined therefrom by formula (3) below, using θ=π in formula (2) above.

$$\rho_{OPT} = \frac{0.25mn\ (1+\kappa)^2}{\kappa} \quad (3)$$

Described above was an analysis of teeth meshing using rack approximation. The movement locus Lc1 obtained by rack approximation is somewhat different from a movement locus when the actual number of teeth is considered, but rack approximation is sufficient to determine the maximum value $\rho_{OPT}$.

As long as it is merely for the meshing range to be kept to the maximum, the arc radius ρ of the flexible externally toothed gear 4 may fulfill the relation $\rho \leq \rho_{OPT}$. In such a case, it is necessary to consider the balance between the arcuate tooth profile (convex arc a) of the flexible externally toothed gear 4 and the tooth profile to be generated on the rigid internally toothed gear 2, and avoid too small a radius value for considerations related to wear of the arcuate tooth profile. Taking the above points into account, the arc radius ρ of the flexible externally toothed gear 4 is preferably a value within a range of up to 5% of the minimum value $\rho_{OPT}$.

Figure 4:
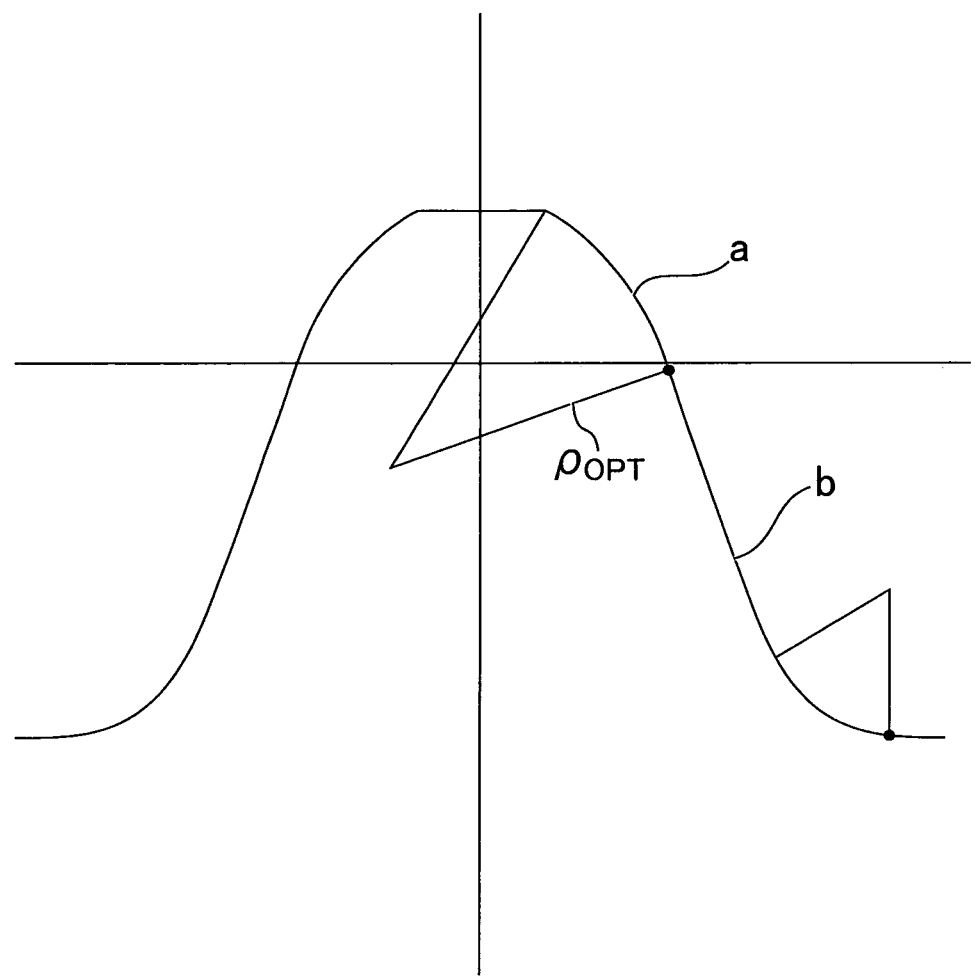
FIG. 4 is a descriptive diagram showing an example of a tooth profile of a flexible externally toothed gear obtained according to the present invention.

FIG. 4 is a descriptive diagram showing an example of a tooth profile of a flexible externally toothed gear and a rigid internally toothed gear. A tooth profile b of a dedendum connected to the arcuate profile a of the flexible externally toothed gear 4 should be one that causes no interference, and comprises, e.g., a straight line and a fillet curve.

(Method for Determining Tooth Profile of S-Side Rigid Internally Toothed Gear)

The tooth profile of the S-side rigid internally toothed gear 2 is one formed according to the movement locus over which the arcuate tooth profile a of the flexible externally toothed gear 4 is drawn with respect to the rigid internally toothed gear 2, with the actual number of teeth being taken into account. In order to increase the ratcheting torque, the tooth depth must be made as large as possible. Therefore, the movement locus is preferably used to the maximum extent.

FIG. 3 is used as a reference to describe determining the movement locus Lc2, wherein the arc center of the arcuate tooth profile a of the flexible externally toothed gear 4 is drawn with respect to the S-side rigid internally toothed gear 2, and consideration is given to the actual number of teeth. A parallel curve c set apart from the movement locus Lc2 by the arc radius ρ is determined. The parallel curve c is used on a main part of a tooth profile to be generated on the S-side rigid internally toothed gear 2.

It is moreover preferable to determine a movement locus that accounts for the actual number of teeth and is obtained from a tooth crest of the tooth profile of the flexible externally toothed gear 4 drawn with respect to the rigid internally toothed gear 2; and to have a maximum value of a tooth depth of the tooth profile to be generated on the S-side rigid internally toothed gear 2 be a value up to the extrema of the movement locus.

(Example of Meshing Between Flexible Externally Toothed Gear and S-Side Rigid Internally Toothed Gear)

Figure 5:
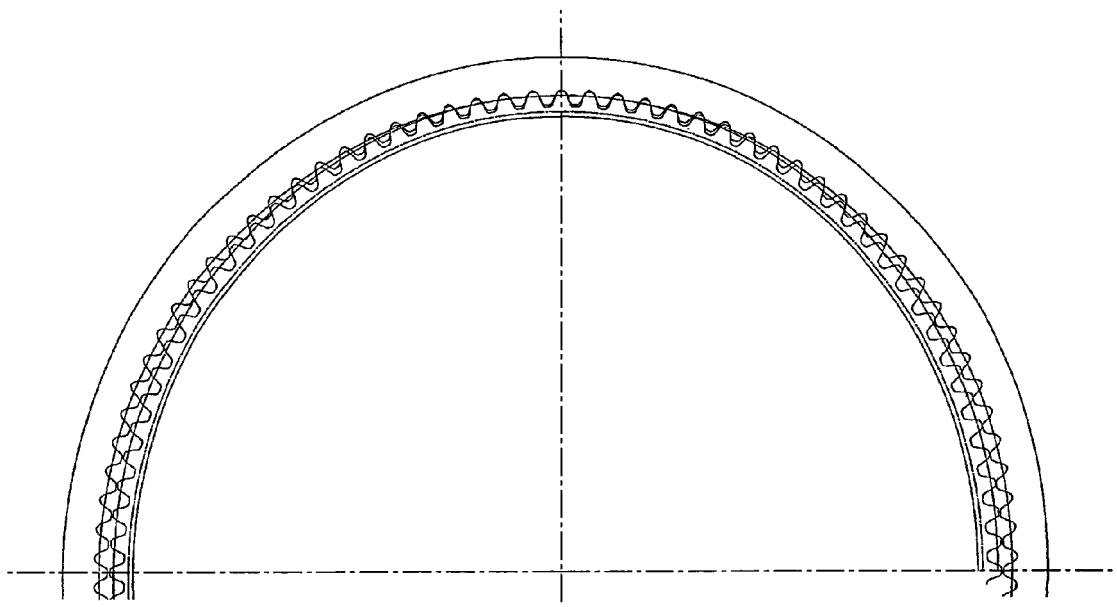
FIG. 5 is a descriptive diagram showing meshing between an S-side rigid internally toothed gear and a flexible externally toothed gear, and a tooth profile formed on the S-side rigid internally toothed gear, in a cross-section of a flat wave gear device given perpendicularly with respect to the axis.

FIG. 5 shows meshing between an S-side rigid internally toothed gear and a flexible externally toothed gear, and a tooth profile formed on the S-side rigid internally toothed gear, in a cross-section of a flat wave gear device given perpendicularly with respect to the axis. The drawing shows that in a case where the S-side rigid internally toothed gear and the flexible externally toothed gear have a finite number of teeth; i.e., 102 and 100 respectively, optimizing the arc radius according to rack approximation as practiced in the present invention will also be effective in a case where the number of teeth is finite. In this case, an optimal value is used for the arc radius of the tooth profile of the flexible externally toothed gear.

The invention claimed is:

1. A flat wave gear device, comprising:

a D-side rigid internally toothed gear;

an S-side rigid internally toothed gear disposed in parallel in a coaxial state with the D-side rigid internally toothed gear;

an annular flexible externally toothed gear disposed in a coaxial state within the D-side and the S-side rigid internally toothed gears; and a wave generator for causing a cross-section of the flexible externally toothed gear given perpendicularly with respect to an axis thereof to flex elliptically and the resulting shape to rotate;

a number of teeth on the D-side rigid internally toothed gear being the same as a number of teeth on the flexible externally toothed gear, and a number of teeth on the S-side rigid internally toothed gear having 2n more teeth, n being a positive integer, than the number of teeth on the flexible externally toothed gear;

the flat wave gear device having a tooth profile derived from the following method:

using both the flexible externally toothed gear and the S-side rigid internally toothed gear as spur gears of module m;

setting κmn, wherein κ≤1, and −κmn as a degree of radial flexing on, respectively, a major and minor axis of an elliptically shaped rim neutral line of the flexible externally toothed gear, a line passing through the center part along a thickness direction of a tooth root rim when the flexible externally toothed gear is deformed into an elliptical shape, in the cross-section of the flexible externally toothed gear given perpendicularly with respect to the axis;

determining a rack-approximated movement locus of the flexible externally toothed gear with respect to the S-side rigid internally toothed gear accompanying rotation of the wave generator;

taking $\rho_{OPT}$ as a minimum value of a radius of curvature of the movement locus; and using a convex arc having a radius ρ, wherein $\rho \leq \rho_{OPT}$, on a main part of a tooth profile of the flexible externally toothed gear;

wherein the method for setting the tooth profile in the flat wave gear device further comprises:

determining the movement locus using formula (1);

determining an evolute of the movement locus using formula (2); and determining the radius of curvature $\rho_{OPT}$ using formula (3), with $\theta=\pi$ in formula (2)

$$x = 0.5mn(\theta - \kappa\sin\theta) \qquad (1)$$
$$y = -\kappa mn(1 - \cos\theta)$$

$$x = mn\left[0.5(\theta - \kappa\sin\theta) + \frac{2\{0.25(1 - \kappa\cos\theta)^2 + \kappa^2\sin^2\theta\}^{1.5}}{\kappa(\kappa - \cos\theta)}\cos\left\{\tan^{-1}\frac{0.5(1 - \kappa\cos\theta)}{\kappa\sin\theta}\right\}\right] \qquad (2)$$

$$y = mn\left[\kappa\cos\theta - 1 + \frac{2\{0.25(1 - \kappa\cos\theta)^2 + \kappa^2\sin^2\theta\}^{1.5}}{\kappa(\kappa - \cos\theta)}\sin\left\{\tan^{-1}\frac{0.5(1 - \kappa\cos\theta)}{\kappa\sin\theta}\right\}\right]$$

$$\rho_{OPT} = \frac{0.25mn\,(1 + \kappa)^2}{\kappa}. \qquad (3)$$

2. The flat wave gear device according to claim 1, wherein the method for setting the tooth profile in the flat wave gear device further comprises:

setting the radius $\rho$ of the convex arc of the flexible externally toothed gear to be a value within a range of up to 5% of the minimum value $\rho_{OPT}$.

3. The flat wave gear device according to claim 1, wherein the method for setting the tooth profile in the flat wave gear device further comprises:

determining a movement locus wherein a center of the convex arc of the flexible externally toothed gear is drawn with respect to the S-side rigid internally toothed gear, with consideration given to the number of teeth of the flexible externally toothed gear and the S-side rigid internally toothed gear;

determining a parallel curve set apart from the movement locus by radius $\rho$; and using the parallel curve in a main part of a tooth profile to be generated on the S-side rigid internally toothed gear.

4. The flat wave gear device according to claim 3, wherein the method for setting the tooth profile in the flat wave gear device further comprises:

determining a movement locus wherein a tooth crest of the tooth profile of the flexible externally toothed gear is drawn with respect to the S-side rigid internally toothed gear, with consideration given to the number of teeth of the flexible externally toothed gear and the S-side rigid internally toothed gear; and making a maximum value of a tooth depth of the tooth profile to be formed on the S-side rigid internally toothed gear a value up to the extrema of the movement locus.

* * * * *